Figure 1:
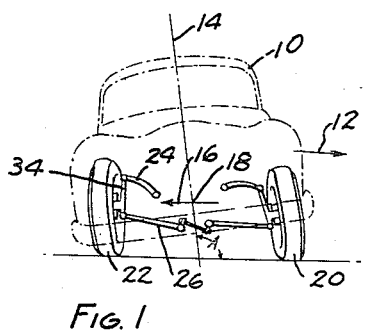

Sept. 16, 1958     J. W. GAINES     2,852,269
AUTOMOTIVE VEHICLE STABILIZING MEANS
Filed Jan. 8, 1954     4 Sheets-Sheet 1

INVENTOR.
JOHN W. GAINES
BY
Wilson, Redrow, and Gaines
ATTORNEYS.

Sept. 16, 1958         J. W. GAINES         2,852,269
AUTOMOTIVE VEHICLE STABILIZING MEANS
Filed Jan. 8, 1954                        4 Sheets-Sheet 2

INVENTOR.
JOHN W. GAINES
BY
Wilson, Redrow, and Gaines
ATTORNEYS

Sept. 16, 1958    J. W. GAINES    2,852,269
AUTOMOTIVE VEHICLE STABILIZING MEANS
Filed Jan. 8, 1954    4 Sheets-Sheet 3

INVENTOR.
JOHN W. GAINES
BY
Wilson, Redrow, and Gaines
ATTORNEYS.

Sept. 16, 1958 J. W. GAINES 2,852,269
AUTOMOTIVE VEHICLE STABILIZING MEANS
Filed Jan. 8, 1954 4 Sheets-Sheet 4

INVENTOR.
JOHN W. GAINES
BY
Wilson, Redrow, and Gaines
ATTORNEYS.

United States Patent Office 2,852,269
Patented Sept. 16, 1958

2,852,269

AUTOMOTIVE VEHICLE STABILIZING MEANS

John W. Gaines, Detroit, Mich., assignor to Studebaker-Packard Corporation, a corporation of Michigan Application January 8, 1954, Serial No. 403,016

20 Claims. (Cl. 280—124)

The present invention relates to linkage type stabilizer means for providing anti-roll stability in automotive vehicles generally and particularly in independently sprung passenger cars having torsion type load springs for the individual opposed suspensions thereof.

An object of the invention is to provide a quiet and efficient yet short length and low cost stabilizing means especially adapted for vehicles having torsion load spring suspensions in conjunction with independently sprung ground wheels which are thereby connected to the opposite sides of the vehicle.

Hitherto popular solid axle or swing axle type front suspensions have generally been supplanted during the past twenty years in four wheel type passenger car service by suspension systems wherein the front and rear suspensions at one side of the car are at least independent of the suspensions at the opposite side and in many systems are independent of one another front to rear as well. Thus the shock transmitting solid axles of car front suspensions of the 1920's and before have given way to public acceptance of independent type suspension systems in which road shocks at one side of the car find no solid metal path as across a continuous front axle to the other side and are consequently not communicated thereto and hence set up no unwanted dynamic cross disturbances in the front end of the car. Along with the foregoing evolution in front end constructions since the 1920's, there has been an accompanying change in vehicle speeds and in road conditions which further influence behavior of suspensions, particularly front suspensions. The high speed smooth curves on our present day highways, for instance, cause wheeled vehicles having individual front suspensions to have a marked tendency to roll on the turns due to the transference of weight to the outer wheel by centrifugal force. Inasmuch as exaggerated roll gives an unpleasant sensation to the vehicle occupants, an anti-roll stabilizer must be added to reconnect the suspensions at the two front wheels—after so much has been done to make them independent. The anti-rolling stabilizer is a helper spring to a car when it is rounding a curve and is effective to transfer some of the pressure from the outside load spring, for instance a torsion bar type load spring on the outer side with respect to the curve, to the torsion bar load spring on the inner side with respect to the center of the curve. Naturally, tying together the two torsion springs in this manner has considerable effect in deadening the independent action of the suspensions at the sides of the car. But with present designs it is the lesser of the two noted disadvantages, namely the disadvantage of the dead acting solid or swing axle as compared to the disadvantage of the partially deadened individual front suspensions which are tied together.

It is an object of the present invention to provide structure for tying together the two front suspensions and the associated torsion load springs on the vehicle and still avoid a direct metal-to-metal path for dynamically transferring cross motion between the suspensions. According to a feature of several specific embodiments of the invention, the torsion load springs are in closely spaced adjacency to one another and the stabilizing means therebetween includes a relatively short stub link having articulately connected opposite end cranks of which one or both of the latter are connected to the adjacent torsion bar spring by means of a nonmetallic torsional joint preferably formed of rubber or other elastic cushioning material which may be pre-calibrated as to its exact consistent torsional characteristics.

An additional object of the invention is to provide for a vehicle, a stabilizing linkage including a relatively short stub link element and end crank elements as the foregoing in which a rubber cushioned type of articulated connection is included between each two adjacent elements to allow a positive swingable or pivotally tiltable motion as the articulated action of the linkage occurs.

Another object of the invention is the provision of a stabilizing means as aforesaid which when employed in association with steerable front ground wheels does not interfere with or restrict steering movement of such wheels and which thus makes possible a relatively short turning radius for the vehicle.

A yet further object of the invention is to provide a stabilizer for vehicles characterized by individual wheel suspensions and such as may be mounted altogether free of the so-called sprung portions, or as better termed, the load carrying supported parts of the vehicle and such as may be supported and carried solely by the so-called unsprung portions, or as better termed the movable parts supporting the load carrying supported parts of the vehicle.

A yet further object of the invention is the provision of a stabilizer suitable to be fitted between individually sprung opposed wheel suspensions such that the rate of the load springs is not interfered with in their resilient suspension function yet a stabilizing tendency is ever in existence owing to the presence and strategic location of the stabilizer in conjunction therewith.

A still further object is the provision, in an individually sprung vehicle, of a stabilizing system having a point of inherent elasticity therein provided by a loaded elastic joint structure which in association with the thus anti-rolling individual wheel suspensions offers the foregoing advantages and will also readily accommodate the installation and removal of a lifting jack.

Figure 2:
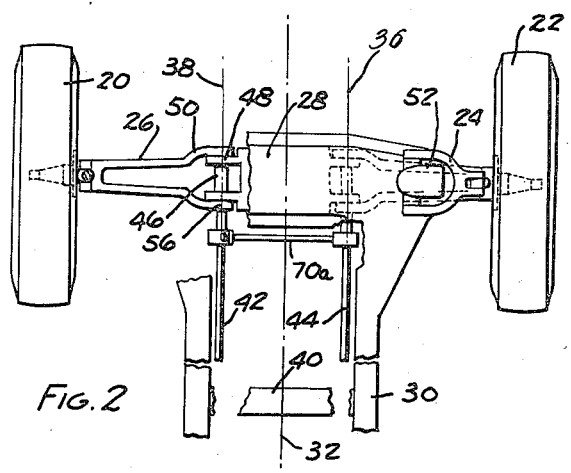
Figure 3:
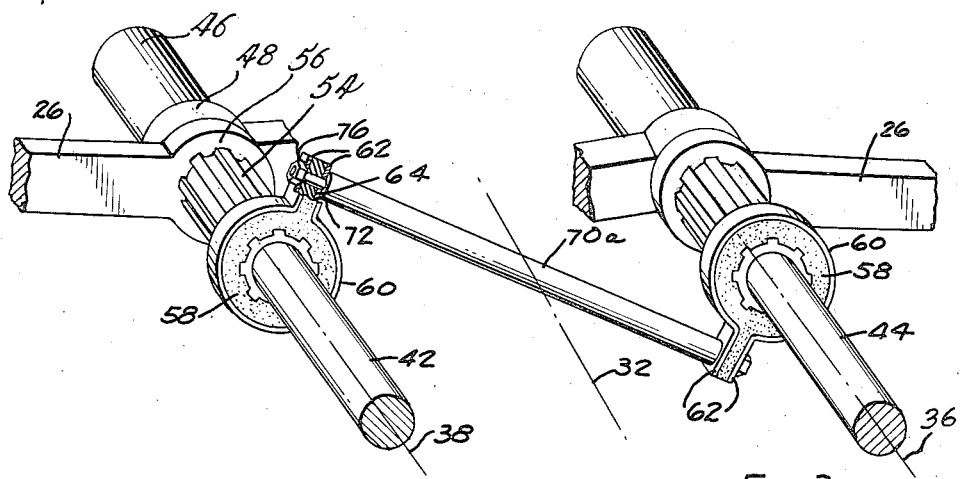
Figure 6:
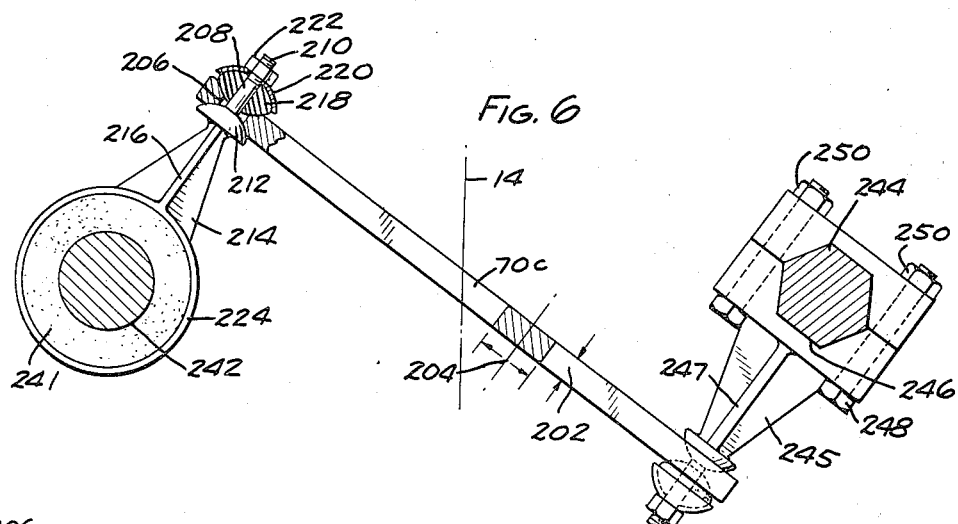
Figure 7:
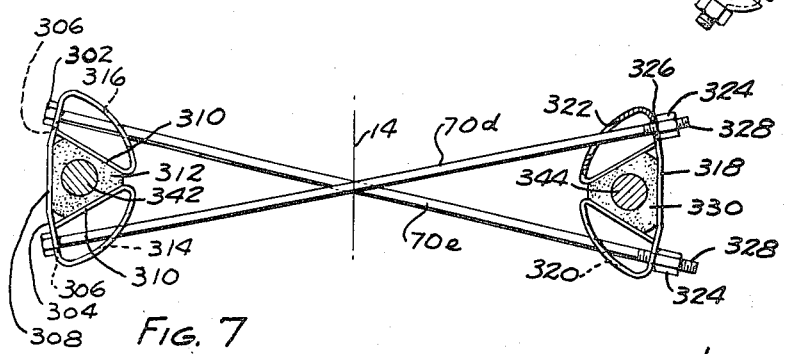
Figure 8:
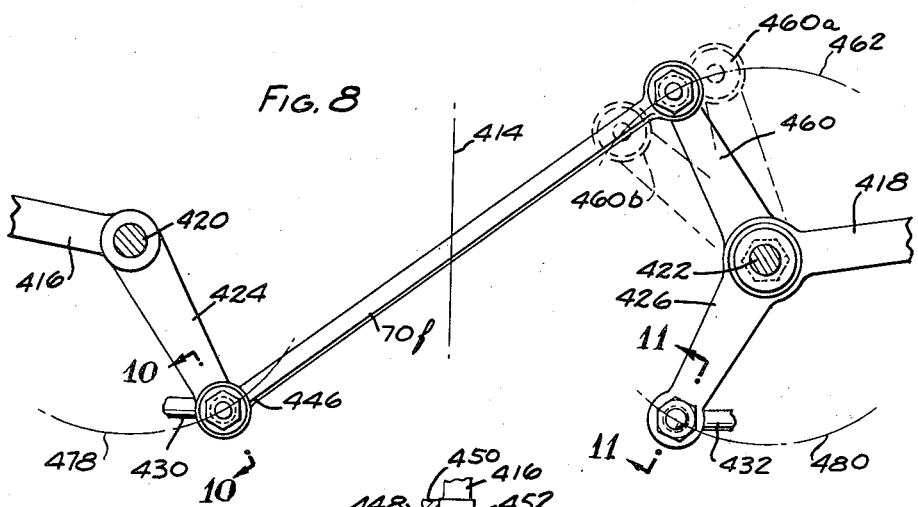
Figure 9:
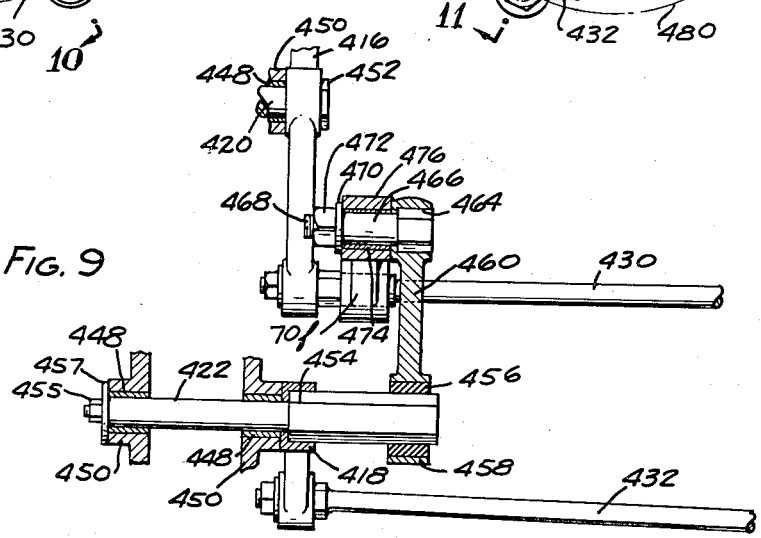
Figure 10:
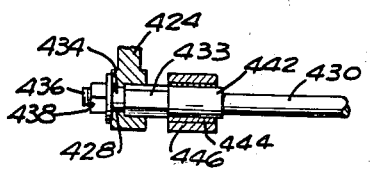
Figure 11:
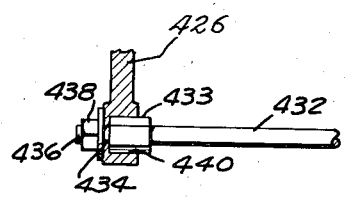
Figure 12:
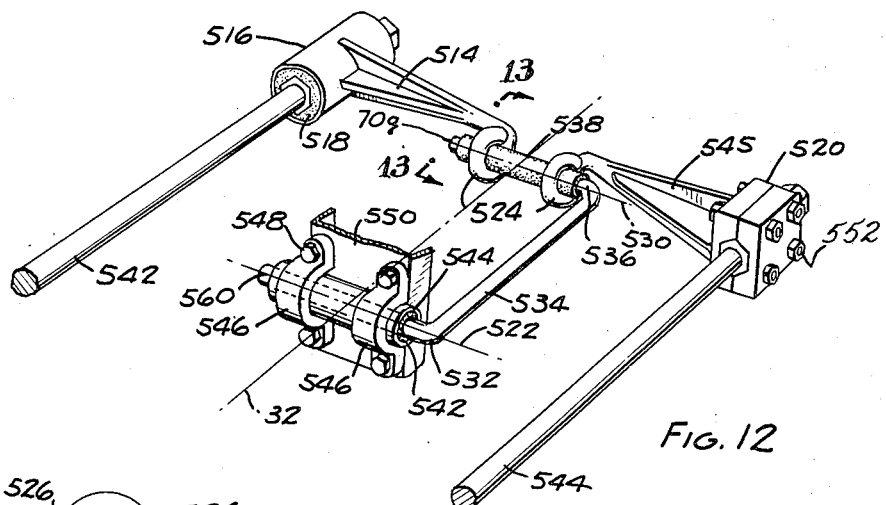
Figure 13:
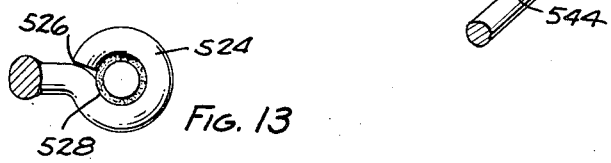
Figure 14:
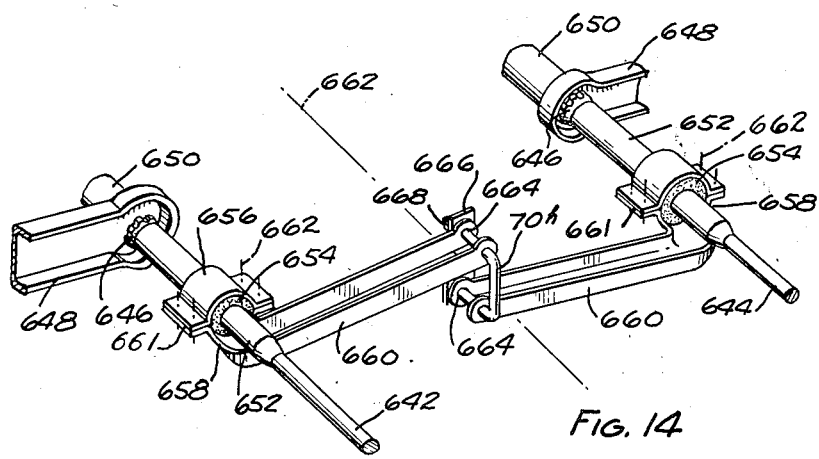
Figure 15:
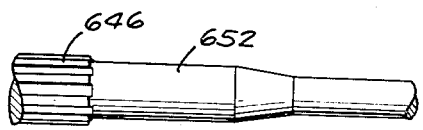

Further features, objects and advantages will either be specifically pointed out or become apparent when for a better understanding of the invention reference is made to the following written description taken in conjunction with the accompanying drawings in which Figures 1 and 2 are front elevation and top plan views of the stabilizer invention applied to a vehicle suspension, Figure 3 is a perspective view of the stabilizer of Figures 1 and 2, Figures 4 and 5 show a modified form of the invention, Figures 6 and 7 respectively, show further modifications of the invention, Figures 8 and 9 are front elevation and side elevational views of another modification, and Figures 10 and 11 are sections taken along the lines 10—10 and 11—11 of the modification of Figure 8, Figures 12 and 13 show an additional modification of the stabilizer, and Figures 14 and 15 show another modification of the stabilizer.

In the first figure of the group of Figures 1, 2, and 3, an oncoming automotive vehicle 10 is shown and as represented is negotiating a curve the center of which is in the direction of an arrow 12 and as a consequence the longitudinal midplane of the vehicle at 14 is tilted to form an obtuse angle A with respect to the horizontal. Due to centrifugal effects resulting from turning the curve, a centrifugal force component indicated by a vector 16 may be represented as being concentrated at the center of gravity of the car roughly indicated at 18. The vector 16 is a convenient means of visualizing why body roll to the outside occurs on turns and how there is a general transference of weight to the two wheels at the outer side of the body as described in a preceding paragraph. The necessary anti-roll stabilization to oppose such unequal weight transfer is used directly in connection with a specific wheel suspension structure of the vehicle 10 described as follows. Thus, the vehicle 10 has a pair of left and right front wheels 20, 22 disposed on opposite sides thereof and connected thereto by means of individual parallelogram-type suspension linkages. Each such linkage includes a pair of vertically spaced upper and lower control arms 24, 26 connected at their inner ends to a cross member 28, Figure 2, forming part of the vehicle chassis frame 30. The links 24, 26 of each pair extend laterally with respect to the longitudinally extending vehicle center line indicated at 32 and are connected at their outer end to a vertically disposed wheel connected member 34 which, in the usual case, carries a knuckle support and a wheel spindle about which each of the respective wheels 20 and 22 rotates. The inner ends of the control arms 24, 26 are bifurcated and are supported for oscillation about generally longitudinally extending pairs of horizontal axes 36 and 38, Figure 3. The frame 30 may be provided with an intermediate cross member 40 for supporting the rear end of the engine, not shown, and for generally adding rigidity to the chassis. A pair of torsion bars 42, 44 disposed one at each side of the vehicle provide the load springs for the individual suspensions and extend generally longitudinally of the vehicle along the noted axes 38. The load springs 42 and 44 may be interconnected at their rear ends with rear wheel suspensions, not shown, or may be non-rotatably secured as to the engine supporting cross member structure 40 depending on the type of suspension system preferred. The front portions of the torsion bars 42, 44 have a smooth cylindrical surface 46 at their extremities which are journaled for rotation in a pair of longitudinally spaced apart frame bearings 48 rigid with the cross member 28. The tip of the smooth portion 46 is secured as by a threaded fastener to a forward one 50 of the bifurcated inner end portions 50, 56 of the lower control arm 26. A rotary type shock absorber 52 concentric with the axis 36 may be provided to control the rate of motion of oscillation of the bifurcated inner end portion of the upper control arm 24. Each of the torsion bars 42, 44 has a splined portion 54 which is adjacent to and in longitudinal alignment with the smooth cylindrical portion 46.

The splines of the splined portion 54 are common to two members of the vehicle suspension. Thus, at their forward end the splines are non-rotatably received in a set of companion hub splines formed at the inner end of the other bifurcated portion 56 of each lower control arm. Also the same splines are received in a companion set of splines formed in the core of an elastic-bodied torsion spring 58. The elastic medium employed in the spring 58 is preferably of rubber, elastic plastic, synthetic resins, neoprene or the like elastomeric composition susceptive of accurate calibration as to stress-strain behavior. The spring 58 at its outer periphery is encircled by a split bearing-like strap 60 having a set of opposed spaced apart ears 62 and functioning as an end crank or end member in a manner hereinafter set forth. A portion of the body of elastic material as at 64 maintains the ears 62 in a continual spaced-apart relationship to accommodate slight relative movement and flexibility. It will be noted that the ears 62 at one side of the vehicle are in the general transverse vertically disposed plane containing the ears 62 at the opposite side of the vehicle but extend in opposite directions with respect to one another in such plane and with respect to the torsion bars 42 and 44. The torsion bars 42 and 44 provide a multiple function one aspect of which is to serve as the inner pivot about which the lower control arms 26 oscillate conjointly therewith. The lower control arms move in unison with the torsion bars 42, 44 about the respective longitudinal axes of the latter indicated at 38, 36 owing to the splined connection at 54.

In addition to serving as the inner pivots and also as the load springs for the suspensions owing to the splines 54 just noted, the torsion bars 42, 44 are instrumental in providing means for stabilizing the vehicle by providing an anti-roll interconnection between the opposite suspension.

Illustrative of one example of an anti-roll interconnection is a stabilizing linkage element including a center link section 70a. At its opposite ends the center section 70a is reduced and threaded so as to provide a shoulder 72. The opposite threaded end portions of the strut type center section 70a are received in registering apertures through the ears 62 and through the included offset portion 64 of elastic body 58. A fastener such as a threaded nut 76 may be used in assembly to secure together the center section and the end members 60. The mechanics of the stabilizer linkage just described is such that when the front wheels 20, 22 rise in unison from a mid-position, the center section 70a idly swings to the right as viewed in Figure 3 in a general transverse vertical plane without appreciably deforming or loading the elastic core means 58. Conversely, falling movement of the front wheels 20, 22 in con-joint motion from a mid-position such as occurs during the time at which a rut is encountered in the road causes the center section 70a to swing idly to the left as viewed in Figure 3 without appreciably loading the elastic core means 58 or interfering with the spring rate of the torsion load springs 42, 44. Under the circumstances of a roll condition as produced by a curve in the road however, as shown in Figure 1, the elastic medium 58 acts as a calibrated joint which opposes any motion of either lower control arm 26 in an opposite vertical direction from the other control arm. Accordingly under influence of the two calibrated core means 58, the suspensions tend to right themselves and bring the longitudinal midplane 40 of the vehicle into a position of normalcy to the road surface on which the vehicle is traveling. The elastic medium 58 forming the joints at the opposite sides of the vehicle are arranged preferably to yield angularly to about the same degree regardless of which side of the vehicle goes down or up. The ears 62 and the included portion 64 of the elastic medium permit a slight tilting action to occur as between the stabilizer center section 70a and the end cranks 60 which surround the respective torsion bars.

Figure 4:
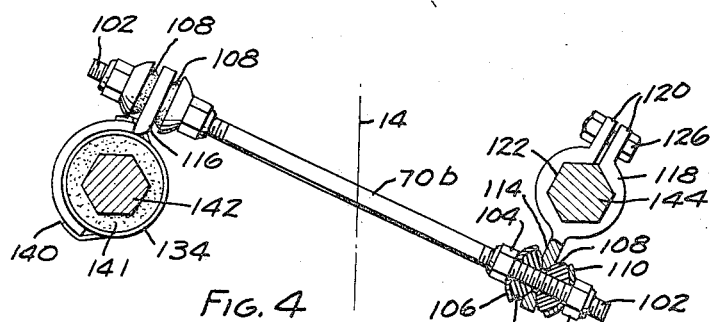
Figure 5:
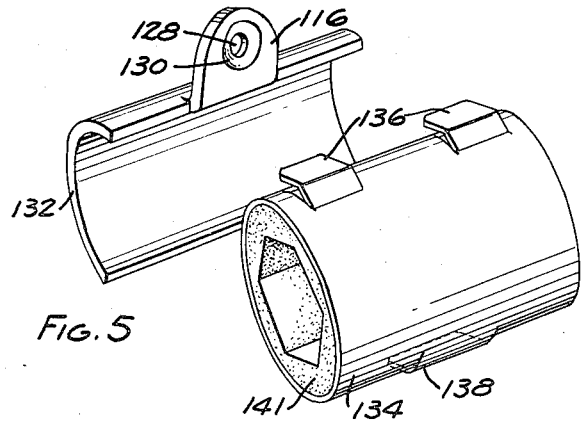

Illustrative of another example of stabilizer means is an element which includes a strut type center section 70b according to Figure 4. The center section 70b extends on both sides of the longitudinal midplane of the vehicle at 14 and is threaded at both extremities as at 102. An inner nut 104 at each threaded extremity engages an apertured cup 106 within which there is seated one of a pair of apertured cushions 108 which are preferably formed of rubber, elastic plastic, resins, neoprene or other suitable elastomeric material. An opposed companion cup 110 is apertured and held in place by an outer nut 112. The nuts in this instance are preferably of the "Nylock" type having a nylon insert included in the dome thereof at one end to prevent loosening of the nut. Included between the pairs of companion rubber cushions or biscuits 108 are spherically recessed and apertured lugs 114, 116 one of which is integrally carried by a diametrically split hub member 118 having bifurcated ears 120 provided with registering sets of apertures. The hub member 118 forms an end crank for the stabilizer center section 70b and includes a hexagonal formation 122 on its interior surface for receiving the companion hexagonal outer surface of a longitudinal torsion bar 144. Except for its noted hexagonal surface, the torsion bar 144 is similar to the spline-providing torsion bar 44 of the preceding embodiment of Figure 3. A fastener means which may be a nut and bolt connection 126 secures together the ears 120 on the diametrically split hub member 118 so as to make it fast to the torsion bar 144. The lug portion 116 clamped between the rubber cushions 108 at the opposite side of the vehicle is best seen according to Figure 5. Similar to the lug portion 114, the lug portion 116 has a central aperture 128 and a pair of spherically concave recesses 130 formed at the opposite ends of the aperture 128. The body to which the lug portion 116 is integrally attached has the formation of a semi-cylindrical sleeve 132 which is adapted to be received about a metal cylinder 134 having a pair of spaced apart ears 136 at one side thereof and a single ear 138 at the diametrically opposite side thereof. The semi-cylindrical sleeve 132 engages one side of the cylinder 134 and is received within the ears 136, 138 and may be welded thereto as at 140 in Figure 4. The metal sleeve 134 is of a bearing-like construction and receives therewithin a body 141 of elastic material which at the core receives a hexagonal portion of a torsion bar 146 which, except for having a hexagonal section rather than splines, is similar to the torsion bar 42 of the preceding embodiment. The elastic medium 141 has the interior surface of the core thereof formed with a hexagonal cross section presenting a companion surface to the hexagonally formed end of the torsion bar 142. The operation of the embodiment of Figure 4 is essentially the same as the operation of the embodiment of Figure 1 and the rubber cushions 108 cooperate together to provide a positive but tiltable swing connection between the opposite ends of the stabilizer center section 70b and the end cranks or end members 118 and 132.

Illustrative of another example of anti-roll stabilizer means is a stabilizer element including a center section 70c of substantially rectangular section according to the embodiment of Figure 6. The stabilizer center section 70c is of uniform cross section extending to either side of the longitudinal midplane 14 of the vehicle and having a depth dimension indicated at 202 which is approximately one-third the width dimension as indicated at 204. At its opposite ends the center section 70c is transversely apertured as at 206 and receives a crank stem 208 which has threads 210 at its outer end. The stem 208 is integrally joined to a spherically concave shoulder 212 carried by a crank arm member 214 having four longitudinal reinforcing ribs 216. At opposite ends of the aperture 206 the center section 70c is formed with symmetrical semi-spherical recesses one of which receives the shoulder 212 and the other of which receives a toroidally oval rubber-like cushion 218 formed of rubber, elastic plastic, resin, neoprene or other suitable elastomeric material. An apertured cup 220, held in place by a lock washer and a retainer nut 222, engages the cushion 218 and is clamped thereagainst owing to the threaded engagement between the nut 222 and the threads 210. A positive tiltable swing connection is therefore provided between the crank arm 214 and the center section 70c. The crank arm 214 has a bearing type hub 224 which concentrically encircles a torsion bar 242 having a smooth cylindrical exterior and which, in all other respects, corresponds to the preceding torsion bar load spring 42 of Figure 3. A body of elastic material 241 is included between the concentric parts 224 and 242 and bonded therebetween and provides a calibrated elastic joint. Elastic material such as rubber, elastic plastic, neoprene or other elastomer may be used to compose the body 241. A crank arm 245 may be provided at the opposite end of the center section 70c and at their mutually adjacent outer ends the two members form a joint similar to the joint already described. At its inner end, however, the crank arm member 245 rigidly engages a hexagonal section of a torsion bar load spring 244 which is similar to the load spring 144 of the embodiment of Figure 4. A rigid non-rotatable joint results and all relative motion of rotation between the crank arms 214, 245 and the torsion bars occurs at the location in the torsion bar 242 surrounded by elastic medium such as at 141 in Figure 4 and 241 in Figure 6. The crank arm 245 has a set of four stiffening ribs 247 and a two-part hub portion which complementally hexagonally receives the hexagonal section of the torsion bar 244 and the two parts of the hub are secured together as by connecting rod type bolts and nuts 248, 250.

Illustrative of an additional example of stabilizer means is a two link element including the crossed center sections 70d and 70e according to the embodiment of Figure 7. The center sections 70d and 70e extend on each side of the longitudinal midplane 14 of the vehicle and by the designed proportions shown have a critical slenderness ratio which could give rise to buckling under compression loads and therefore make it expedient to use the sections only under tension. The center sections 70d and 70e are arranged in separate, closely spaced adjacent vertical planes and at their mid portions do not interfere with one another or chafe together in operation. At the left end as viewed in Figure 7, the center sections 70d and 70e are provided with bolt head abutments 302 which may be semi-spherically rounded at their bottom ends and received in complementally spherically rounded sockets 304 which are formed adjacent a pair of apertures 306 formed in a strap-like bearing member or bracket 308. The bracket 308 has a pair of reversely bent end portions 310 which, together with the center portion of the bracket, surround a triangular body of elastic material 312 on all three sides. The elastic material may be rubber, elastic plastic, or other suitable elastomer so as to form a calibrated torsion joint between the bracket 308 and the smooth cylindrical surface of a torsion bar 342 similar to the torsion bar 242 of the preceding embodiment of Figure 6. The core of the body 312 is vulcanized or otherwise bonded to the surface of the torsion bar 342. The reversely bent portions 310 of the bracket 308 are provided with elongated longitudinal slots 314, 316 which accommodate slight tilting movement of the center sections 70d and 70e with respect to the end bracket 308. A similar bracket 318 is provided at the opposite ends of the center sections 70d, 70e and has a set of similar tilt-accommodating slots 320, 322 through which the center sections pass. A pair of nuts 324 is provided each having a spherically convex surface 326 which permits limiting tilted movement between the nut and the bracket 318 and each being received on a set of threads 328 formed on the individual ends of the center sections 70d and 70e. A triangular shaped body of elastic material 330 is surrounded on three sides by the bracket 318 and has a hollow cylindrical interior at the core which is bonded to and receives a companion cylindrical torsion bar surface 344 which is similar to the previously considered bar 342. The elastic material 330 may be formed of rubber, elastic plastic, resins, neoprene or other suitable elastomer capable of providing a calibrated torsion spring joint between the bracket 318 and the torsion bar 344.

The nuts 324 are drawn down tight in assembly to stretch the center section rods 70d, 70e for two reasons, one being that the particular rods are axially strong only in tension and hence must be pre-stressed so as to insure that under all conditions they act only in tension, and the other reason being that tensioned prestress in the rods results in clamped prestress in the end members 308, 318 so as to insure a secure hold onto the outside of the triangular elastic bodies 312, 330.

In operation, when the torsion bars 342, 344 concurrently rotate clockwise in Figure 7 due to appropriate deflection of the suspensions, not shown, the center section rod 70d is loaded in tension as the bodies 312, 330 wind up under stress; the counterpart rod 70e assumes no part of such loading at that time. Vice versa, the rod 70e becomes loaded and the rod 70d does not participate in assuming the load when the ends of the torsion bars 342, 344 concurrently rotate counterclockwise as viewed in Figure 7.

Illustrative of an additional example of a stabilizer means adapted to a slightly different environment is a linkage according to Figures 8, 9, 10, 11 which includes a stabilizer center section 70f. The stabilizer center section 70f extends on both sides of the midplane 414 of a vehicle and is disposed between a pair of opposite laterally extending suspension links 416, 418 which may either constitute the lower control arms of opposed front suspensions or else load links linked to the front suspension lower control arms. In either case, the suspension links 416, 418 are pivoted to swing about separate longitudinally extending substantially horizontal axes defined by a set of frame supported pivots 420 and 422. The link 416 is noted to have a crank-like inwardly and downwardly directed extension 424 and similarly the suspension link 418 has an inwardly downwardly directed crank-like extension 426. The extreme end of the first-named crank-like extension 424 has a transverse opening 428 therethrough according to Figure 10, which opening defines a non-uniform hollow interior having a generally large hexagonal cross section in series with a short smooth section of reduced diameter. Complementally received within the interior of the transverse opening 428 there is provided a torsion bar 430 which is disposed on the right hand side of the vehicle and extends generally longitudinally although at a slightly rearwardly diverging angle with respect to a companion torsion bar 432 on the left hand side of the vehicle. The bars 430 and 432 are dissimilar at their forward ends although at the extremity of each, there is formed a hexagonal portion 433, a tubular spike portion 434, and a set of nut receiving threads 436. A nut received on each of the sets of threads 436 is shown at 438 and secures the hexagonal bar portion 433 in firm engagement within the complemental bore in which it is received. The complemental bore which receives the front end of the torsion bar 432 is indicated at 440 and is formed in the extreme end of the crank-like extension 426. The aspect by which the bars 430 and 432 differ is in connection with a smooth journal portion 442 which is formed only on the bar 430 and has no counterpart on the bar 432. The smooth cylindrical portion 442 is encircled by a bushing type bearing 444 carried by a looped extreme end 446 of the center section 70f.

Each of the frame connected pivots 420, 422 is received in a pair of longitudinally spaced apart coaxial bushings 448 which are at opposite sides of the vehicle and which are each contained in an appropriate frame mounted bearing 450 so as to accommodate rotation of the pivots relative to the frame. A hexagonal portion 452 and 454 is formed on one end of the respective pivots and received within the suspension links 416, 418 in complemental hexagonal recesses in a manner to secure the pivot and link firmly together for conjoint oscillatory rotation. A retainer nut 455 and a washer 457 are secured to the opposite end of the respective pivots 420, 422 and engage the adjacent bearing 450 to assure a firmly held together assembly of parts. The stub-like hexagonal portion 452 is considerably shorter than the longer dual function hexagonal portion 454 which at its rear end is complementally received within the hexagonally sectioned interior of the core presented by an elastic body 456. The elastic body 456 which may be of rubber, elastic plastic, resins, neoprene or like elastomer is accurately pre-calibrated as to its spring rate and is received within the hub portion 458 of a crank member 460. The resulting elastic joint permits relative rotation between the hub 458 and the hexagonal portion 454 of the associated pivot bar such that the crank 460 may move along an arc as at 462 and assume such positions as 460a and 460b according to Figure 8 without any attendant motion necessary on the part of the pivot bar portion 454 and the adjacent suspension. The crank member 460 has a generally transverse bore 464 which is hexagonally shaped throughout a portion of its length and then reduced in diameter to a cylindrical bore. The crank member 460 thus is adapted to receive internally thereof, a compositely hexagonal and smooth sectioned crank pin 466 which carries a set of threads 468 at the extremity of its smooth sectioned end. By means of a washer 470 and a nut 472 received on the threads 468, a sleeve-like bushing 474 and an encircling bearing portion 476 formed on the center section 70f are clamped in place so as to be pivotally connected to the outer end of the crank member 460.

In operation of the embodiment of Figures 8–11, the suspension links 416 and 418 are arranged to move in unison with one another upwardly and downwardly as the vehicle suspensions move upwardly and downwardly together. The corresponding action of the crank-like extensions 424, 426 is, of course, exactly opposite in phase from the noted directions and their corresponding movement is respectively downwardly and upwardly and their outer ends appropriately follow along the arcs of travel generally indicated at 478 and 480. When, however, the opposing crank-like extensions 424 and 426 move opposite to one another due to opposite movement as between the respective suspensions as when the car is rounding a curve, the elastic joint at 456 tends to wind up and is calibrated to oppose any vehicle rolling action at a predetermined rate.

It will be noted that to the extent thus far described, the embodimental constructions of the present stabilizer invention are such that the center section thereof form a slight diagonal angle with respect to the horizontal plane containing the torsion bars and to the horizontal plane containing the inner pivot points of the lower control arms for which the torsion bars serve as load springs.

Illustrative of an additional example of a stabilizing means is the embodiment according to Figures 12 and 13 in which a stabilizer linkage includes a center section 70g which is normally horizontally disposed rather than being slightly diagonal with respect to the horizontal. The actual torsion bar load springs which are indicated respectively at 542 and 544 are substantially identical to the torsion bar load springs of the preceding embodiment according to Figure 4 and extend generally longitudinally of a vehicle in spaced apart relationship one at each side of the vehicle center line indicated at 32. A crank-like member 514 has an inner hub portion 516 which, similarly to the hub 134 of the embodiment of Figure 4, is connected to the hexagonal section of the torsion bar 542 by means of a body of elastic material 518. Similarly to the embodiment of the preceding Figure 6, a crank-like member 545 has a two-part hub 520 which is rigidly bolted as at 522 to a hexagonal portion on the torsion bar 544, much in the same manner of the just noted embodiment of Fig. 6. Each of the relatively adjacent inner ends of the crank like members 514, 545 is formed with a transversely disposed eye as at 524 which is looped so as to close on itself and is welded together at 526 to define an opening 528 which is axially aligned with respect to the opening 528 in the opposite eye 524. In their free position, the normal axis of these eyes is indicated at 530 and is transverse to the vehicle center line 32 and is disposed in the horizontal plane containing the torsion load springs 542, 544. A generally U-shaped bent bar 532 having a twistable base 534 is provided with a pair of legs at the opposite ends of the base 534 and integrally joined thereto. One of the legs is indicated at 536 and forms the center section 70g of the stabilizer element. The leg 536 is rubber-covered as at 538 in order to produce a somewhat quiet acting slip joint as between the stabilizer center section 70g and the eyes 524 so as structurally to inter-relate the same for coordinated quiet movement together. The opposite leg indicated at 560 is similarly rubber covered as at 542 and is received within a tubular metal sleeve 544. A pair of axially spaced apart half bearing brackets 546 is secured as by a set of four or more threaded fasteners 548 to a fixed member 550 of a vehicle chassis so as to clamp the metallic sleeve 544 rigidly thereto and prevent any relative motion. The rubber covering 542 serves as a mere silent bearing for the leg 540 and in the course of the limited movement of rotation contemplated offers no substantial resistance to the bodily swinging motion of the U-shaped bar 532 about an axis 552 with which the bearing 544 is concentric. The axis 552 is disposed generally transversely of the vehicle substantially in the horizontal plane of the torsion bars 542, 544.

By suitable proportioning of the relative rigidity of the elastic core means 518 and the twistable base portion 534 of the metallic U-shaped bar 532, a coaction may be effectuated which in an extreme case could permit all elasticity of the stabilization system to be centered in the bar portion 534 whereas the core means 518 would be substantially unyieldable and provide a rotatably rigid connection; preferably, however, the bar 532 constitutes a relatively stable element of the system and the elasticity of the system is produced due to and measured by the magnitude of relative rotation permitted by the elastic core means 518. Thus, when the torsion bars 542, 544 rotate such that the crank members 514, 545 tilt upwardly and downwardly in unison due to appropriate movement of the opposite suspensions, not shown, the U-shaped bar 532 and the stabilizer center section 538 which it provides swing idly up and down in concurrent motion therewith. When, however, the action of the suspensions is such as to cause either torsion bar to tend to move independently of the other with the result that the crank members 514, 545 move in a vertical direction opposite to one another, the elastic member 518 winds up and yieldingly tends to recoordinate movement of the suspensions so as to prevent the vehicle from rolling.

Illustrative of another example of stabilizer means is a stabilizer element having a vertically disposed center section 70h according to the embodiment of Figures 14 and 15. In the embodiment of Figures 14 and 15, a pair of generally longitudinally extending torsion load springs 642, 644 is provided each with a set of splines as at 646 to which a separate laterally extending suspension member 648 of channel section is appropriately splined. A smooth section 650 which is journaled for rotation to a vehicle frame is formed on each bar 642, 644 forwardly of the spline section 646 and to the rear of the latter there is provided another smooth cylindrical section 652. A body of elastic material 654 surrounds each of the smooth cylindrical sections 652 and is clamped at its outer circumference between an upper bearing cap 656 of semi-cylindrical shape and a channel member portion 658 each of which is provided with a set of ears 661 which engages the other set of ears 661. By means of registering apertures, not shown, the engaged sets of ears 661 are bolted together along the four bolt axes indicated at 662. The channel portions 658 form one leg of a 90° bent set of upwardly open U-shaped channels having a second and longer leg portion 660 which extends inwardly toward the vehicle center line indicated at 662. At the inner adjacent ends of each of the long leg portions 660, a pair of spaced apart ears is provided and formed as with spaced apart registered eyes 664 which receive one of the opposite legs of the vertically disposed stabilizer center section 70h having a general U-shape. The free ends of the legs of the U-shaped center section 70h are passed through a common closing plate 666 and have threaded extremities which receive a retainer nut means 668.

The operation of the stabilizer means of Figures 14 and 15 is somewhat similar to the operation of the preceding embodiment of Figure 1 except that the center section 70h is vertically disposed and tends to move generally vertically rather than diagonally laterally within a transverse plane normal to the vehicle center line 662. The plane of motion of the center section 70h is slightly to the rear of, but is in closely spaced adjacency to, the plane of relative rotation of the elastic core means 654 at each end of the stabilizer element.

In each of the preceding embodiments of the invention, the stabilizer center section generically covered by the reference numeral 70 is arranged to oscillate in a transversely disposed first vertical plane with relation to the vehicle which is so closely juxtaposed to or else exactly in the plane of relative rotation of the elastic core means adjacent one or both ends thereof that it at least approximates the latter plane in every instance. Likewise, the just-noted first vertical plane is so closely juxtaposed to the rotatable front extremities of the torsion bar load springs and the opposed suspensions springably supported thereby that it at least approximates their planes of disposition as well. In the case of all embodiments exclusive of the noted exception of the horizontal center section 70g according to Figure 12, the center sections 70 though being substantially horizontal, are each angularly related to the common horizontal plane containing the torsion bar load springs so as to form a slight diagonal angle relative thereto.

The core means in the embodiments of Figures 6, 7, 12, 14 is either vulcanized or otherwise bonded directly to the adjacent smooth metal surface at its interior, such bonding as contemplated occurring during manufacture or else the core means is precompressed into firm engagement to the surface at its interior at that time so as to bond thereto in time due to aging. The treatment of the core means at its outer periphery is similarly handled in the embodiments of Figures 4, 6, 9, and 12. In the other examples where the outer and inner periphery of the core means interdentally engage noncircular companion surfaces such as splines according to Figure 3, a vulcanizing or bonding process may similarly be employed in addition if desired. In each instance, however, the core means is formed of elastic material susceptive of consistent calibration to produce accurately reliable spring rates and may be of calibrated rubber, elastic plastic, neoprene, synthetic resin, or like elastomer. On the other hand, the elastic material of the remaining articulated or swing connections may be of cheaper uncalibrated forms of quiet rubber, elastic plastic, neoprene, etc.

As herein shown, the calibrated core means of the embodiments including Figures 4, 6, 12 may, in the case of the usual automotive vehicle suspension, be expected to have a calibrated spring rate of approximately 450″ pounds of torque per degree for a total angular relative rotation of approximately 12° (5″ calculated vertical wheel travel between extreme opposite directions), prior to point of engagement of the suspension with the conventionally applied rubber stops or bumpers. Maximum movement beyond the point of impact with the bumpers may extend the overall travel to an extreme total relative rotation to 15°. Such travel is, of course, readily accommodated by a known brand or brands of rubber torsion spring on the market and the necessary 5400″ pounds of torque yielded at maximum travel by the elastic core means is readily available from these same commercial rubber torsion springs. So also the drawing shows core means according to the embodiments including Figures 3, 7 and 14 in which the relative rotation of each of the load-sharing paired elastic core means is reduced to approximately 6° for each of the opposite units in order to accommodate the total normal wheel travel of 12°. At extremes, however, each of the core means in the latter instance is torqued to the necessary 5400″ pounds. In case even less total angular rotation of the core means is desired, the core means 518 of Figure 12 may be so dimensioned in its operation by selection of relatively hard elastic material having an extremely high spring rate and by an accompanying compromise selection of a relatively weaker bar stock for the U-shaped bar 532, that the base portion 534 thereof will yield considerably in torsion to furnish most of the desired elasticity to the system. It is evident, too, though not essential, in the embodiment of Figure 12 that the elastic covering 538 will also provide some further elasticity and quietly occurring flexibility to the stabilizer system. The wheel suspensions themselves actually as shown according to Figure 1, occupy a common vertical transverse plane and within the broader aspects of the invention as contemplated the wheel suspensions are preferably at least transversely aligned and disposed in vertical planes which are related to one another at only a relatively small angle if at all.

Variations within the spirit and scope of the invention described are equally comprehended by the foregoing description.

What is claimed is:

1. For use in conjunction with a torsion load spring type suspension for vehicles characterized by a pair of generally laterally extending suspensions disposed on opposite sides of a vehicle, means including a link type stabilizer element for transferring cross motion between the suspensions to produce anti-roll stability, said stabilizer element comprising a one piece center link section of a fixed length arranged to move in a vertical plane generally transverse to the vehicle, and oppositely extending lever arms at opposite sides of the vehicle pivoted to swing about generally longitudinally extending pivot axes and having means connecting the same for two-way conjoint movement of oscillation with the adjacent suspensions and having means forming separate articulated connections between the center link section and the lever arms at the ends thereof, there being core means forming a calibrated elastic joint included at the side of the vehicle between at least one lever arm and the suspension at that side to provide for independent swingable movement of the former about its corresponding pivotal axis aforesaid, said transverse plane of movement of the center link section at least approximating the vertical plane of each opposite suspension.

2. For use in conjunction with a torsion load spring type suspension system for vehicles characterized by a pair of generally laterally extending suspensions disposed on opposite sides of the vehicle, means including a link type stabilizer element for transferring cross motion between the suspensions to produce anti-roll stability, said stabilizer element comprising a center strut arranged to transfer bodily between positions in a vertical plane generally transverse with respect to the vehicle, and lever arms at opposite sides of the vehicle oscillatable about generally longitudinally extending axes and having means continuously effective to connect the same for conjoint movement of oscillation with the adjacent suspensions and having means forming separate articulated connections between the center strut and the lever arms at the ends thereof, there being core means forming a calibrated rubber torsion spring included in the connection at the side of the vehicle between at least one lever arm and the suspension at that side to provide for independent swingable movement of the former about its corresponding longitudinal axis aforesaid, said transverse plane of movement of the center link section at least approximating the vertical plane of each opposite suspension.

3. For use in conjunction with a torsion load spring type suspension system for vehicles characterized by a pair of generally laterally extending suspensions disposed on opposite sides of a vehicle, means including a link type stabilizer element for transferring motion between the suspensions to produce anti-roll stability, said stabilizer element comprising a motion transferring center link section arranged to move in a vertical plane generally transverse to the vehicle, and lever members at opposite sides of the vehicle oscillatable about generally longitudinally extending axes, said lever members being co-planar and extending in opposite directions in their common plane and having means connecting the same for elastically continually coordinating conjoint movement of oscillation with the adjacent suspensions, there being means forming separate articulated connections between the center link section and the lever members at the ends thereof, there further being core means forming a calibrated elastic joint included in the connection at the side of the vehicle between at least one lever member and the suspension at that side to provide for individual swingable movement of the former about its corresponding longitudinal axis aforesaid.

4. For use in conjunction with a torsion load spring type suspension system for vehicles characterized by a pair of generally laterally extending suspensions disposed on opposite sides of a vehicle, means including a link type stabilizer element for transferring cross motion between the suspensions to produce anti-roll stability, said stabilizer element comprising a motion transferring center link section arranged to shift bodily in a vertical plane generally transverse to the vehicle and lever arms at opposite sides of the vehicle oscillatable about generally longitudinally extending axes, said lever arms having means connecting the same for conjoint movement of oscillation with the adjacent suspensions and having means forming separate articulated connections between the center link section and the lever arms at the ends thereof, there being core means forming a calibrated elastic joint included in the connection at the side of the vehicle between at least one lever arm and the suspension at that side to provide for independent swingable movement of the former about its corresponding axis aforesaid, said transverse plane of movement being in closely spaced adjacency to a vertical plane common to the opposite suspensions.

5. In an automotive vehicle provided with opposed spring suspensions and having torsion bar load springs therefor extending generally longitudinally of the vehicle, said torsion bars being in closely spaced adjacency disposed one at each side of the vehicle and connected at one end to the suspension at that side such that the bar end portion rotates conjointly therewith, stabilizer means for providing an anti-roll interconnection between suspensions and having a center section disposed generally transversely to the longitudinal midplane of the vehicle, end members articulately connected thereto at opposite sides of the vehicle, means for connecting the end members and the corresponding torsion bars and including core means forming a calibrated elastic joint effective to connect at least one member and the end portion of the torsion bar at that side for relative swinging movement about the axis of the latter, said center section and said core means being in a position at least approximating the common vertical plane containing the end portions of the torsion bars and in closely spaced juxtaposition to the suspensions.

6. In an automotive vehicle provided with opposed spring suspensions and having torsion bar load springs therefor extending generally longitudinally of the vehicle, said torsion bars being in closely spaced adjacency disposed one at each side of the vehicle and connected at one end to the suspension at that side such that the bar end portion rotates conjointly therewith, stabilizer means for providing an anti-roll interconnection between suspensions and having a generally transversely laterally oscillatable center section, end members articulately connected thereto at opposite sides of the vehicle, and means for connecting the end members and the corresponding torsion bars and including core means forming a calibrated elastic joint effective to connect at least one member and the end portion of the torsion bar at that side for relative swinging movement about the axis of the later.

7. In an automotive vehicle provided with opposed spring suspensions and having torsion bar load springs therefor extending generally longitudinally of the vehicle, said torsion bars being in closely spaced adjacency disposed one at each side of the vehicle and connected at one end to the suspension at that side such that the bar end portion rotates conjointly therewith, stabilizer means for providing for cross transfer of motion between the suspensions and having a center section of fixed length arranged to move in a transverse vertical plane, end members articulately connected thereto at opposite sides of the vehicle, means continuously effective to connect the end members and the corresponding torsion bars and including core means forming a calibrated elastic joint effective to connect at least one member and the end portion of the torsion bar at that side for relative swinging movement about the axis of the latter, said center section and said core means being in a position at least approximating the common vertical plane containing the end portions of the torsion bars and in closely spaced juxtaposition to the suspensions.

8. In an automotive vehicle provided with opposed spring suspensions and having torsion bar load springs therefor extending generally longitudinally of the vehicle, said torsion bars being in closely spaced adjacency disposed one at each side of the vehicle and connected at one end to the suspension at that side such that the bar end portion rotates conjointly therewith, stabilizer means for providing an anti-roll interconnection between suspensions and having a generally transversely disposed center section, end crank means including a pair of opposed rubber cushions swingably connecting each end crank at the outer end to a different end of the center section from the end at which the outer end of the other end crank is swingably connected, and means for connecting the end cranks and the corresponding torsion bars and including core means forming a calibrated elastic joint effective to connect at least one end crank and the end portion of the torsion bar at that side for relative swinging movement about the axis of the latter.

9. For use in conjunction with a torsion load spring type suspension system for vehicles characterized by a pair of generally laterally extending suspensions disposed on opposite sides of the vehicle, mechanism including link type stabilizer means for interconnecting the suspensions to provide anti-roll stability, said stabilizer means comprising a center link section extending between the suspensions generally transversely of the vehicle, and lever arms at opposite sides of the vehicle oscillatable about generally horizontal axes, said lever arms having means connecting the same for conjoint movement of oscillation with the adjacent suspensions and further having means forming separate articulated connections between the center link section and the lever arms at the ends thereof, there being core means forming a calibrated elastic joint included in the connection at the side of the vehicle between one lever arm and the suspension at that side to provide for swingable movement of the former about its horizontal axis aforesaid, the lever arm at the opposite side being rigid with the suspension at the side therewith, said core means and said rigid connection having a common vertical plane at least approximating the vertical plane of each suspension.

10. For use in conjunction with a torsion load spring type suspension system for vehicles characterized by a pair of generally laterally extending individual suspensions disposed on opposite sides of the vehicle, mechanism including link type stabilizer means for interconnecting the suspensions to produce anti-roll stability between the individual suspensions, said stabilizer means comprising a center link section disposed between the suspensions in a plane generally transverse of the vehicle, and lever arms at opposite sides of the vehicle oscillatable about generally horizontal axes, said lever arms having means connecting the same for conjoint movement of oscillation with the adjacent suspensions and further having means forming swingable connections between the center link section and the lever arms at the ends thereof, there being core means having an inner periphery of non-circular cross section and forming a calibrated elastic joint included in the connection at the side of the vehicle between at least one lever arm and the suspension at that side to provide for swingable movement of the former about its horizontal axis aforesaid, said core means and center link section being in a position at least approximating the common vertical plane of the individual opposite suspensions.

11. In an automotive vehicle provided with opposed spring suspensions and having torsion bar load springs therefor extending generally longitudinally of the vehicle, said torsion bars being in mutually closely spaced adjacency disposed one at each side of the vehicle and connected at one end to the adjacent suspension such that the end portion of the bar rotates conjointly therewith, stabilizer means providing an anti-roll interconnection between suspensions and having a generally horizontally extending center section, means providing the sole support for the center section consisting of end members pivotally connected thereto at opposite sides of the vehicle and having core means forming a calibrated rubber spring elastically connecting at least one member to the torsion bar end portion at that side, said center section and said core means being in closely spaced adjacency with respect to the vertical plane containing the end portions of the torsion bars and with respect to the opposed suspensions.

12. In an automotive vehicle provided with opposed spring suspensions and having torsion bar load springs therefor extending longitudinally of the vehicle, said torsion bars being in mutually closely spaced adjacency disposed one at each side of the vehicle and connected at the front end to the suspension at that side such that the front portion of the bars rotates conjointly with the suspensions, stabilizer means providing an anti-roll interconnection between suspensions and having a center section arranged for lateral movement in a generally vertical plane disposed transversely with respect to the vehicle, end members articulately connected thereto and having core means forming a calibrated spring elastically connecting each of said members and the torsion bar front portion at that side, said core means having an interior surface bonded to a companion surface on the exterior of the corresponding bar front end portion, the plane of relative rotation of the core means at least approximately coinciding with the vertical plane containing the front end portion of the torsion bars.

13. In an automotive vehicle provided with opposed independent spring suspensions and having separate torsion bar load springs therefor extending generally longitudinally of the vehicle, said torsion bars being in mutually closely spaced adjacency disposed one at each side of the vehicle and connected at one end to the suspension at that side such that the front portion of the bar rotates conjointly therewith, stabilizer means providing an anti-roll interconnection between the individual spring suspensions and having a center section arranged for movement in a vertical plane disposed generally transversely to the vehicle, oppositely extending end members on opposite sides of the vehicle and articulately connected to the center section at the ends of the latter, and means connecting the end members and the front portions of the bars including core means forming a calibrated joint elastically connecting at least one member to the front portion of the torsion bar at that side, said core means having an interior surface of non-circular cross section bonded to a companion surface on the exterior of the front portion of the corresponding torsion bar, the plane of relative rotation in said core means being at least approximately coincident with the vertical plane containing the relatively rotatable front portions of the torsion bars.

14. In an automotive vehicle provided with opposed independent spring suspensions and having separate torsion bar load springs therefor extending generally longitudinally of the vehicle, said torsion bars being in mutually closely spaced adjacency disposed one at each side of the vehicle and connected at one end to the suspension at that side such that the front portion of the bar rotates conjointly therewith, stabilizer means providing an anti-roll interconnection between the individual spring suspensions and having a center section arranged for movement in a vertical plane disposed generally transversely to the vehicle, end members on opposite sides of the vehicle and articulately connected to the center section at the ends of the latter, and means connecting the end members and the front portions of the bars including core means forming a calibrated joint elastically connecting at least one member to the front portion of the torsion bar at that side, said core means having a polygonal interior surface receiving a companion surface formed on the exterior of the front end of the corresponding torsion bar, the plane of relative rotation of said core means at least approximating the vertical plane containing the end portions of the torsion bars.

15. In combination, a pair of oppositely disposed means for suspending a vehicle for travel along a horizontal surface, and an equalizer device for transferring cross motion between said pair of means to elastically oppose relative displacement of the latter relative to one another in opposite vertical directions, said device comprising a solid link disposed between said pair of means and having its opposite ends arranged at different sides of the vehicle each adjacent the said means at that side, and end cranks forming the sole support for the link each having a constantly effective connection to said means for two-way coordinated movement therewith, and being connected to the adjacent end of the link and swingably supporting the same bodily for laterally idly swinging movement when the said means are mutually displaced in the same vertical direction, the aforesaid connection between at least one of the end cranks and the corresponding one of said means comprising an elastic joint which winds up in its own plane to store energy when the said means are forceably displaced relative to one another in opposite vertical directions.

16. A device according to claim 5 in which said center section has end bearings swingably connected thereto and encircling the end portions of the torsion bars, and said calibrated elastic joint being included between at least one end bearing and the end portion of the torsion bar at that side for relatively rotatable bearing movement in the plane of the bearing about the axis of the torsion bar.

17. A device according to claim 5 in which said stabilizer means have a center shackle section and end cranks having eyes receiving the shackle to form pivotal joints.

18. A device according to claim 5 in which said stabilizer means includes link means for interconnecting the suspensions to produce anti-roll stability, said stabilizer means comprising a center link section extending between the suspensions generally transversely of the vehicle, said end member comprising lever arms at opposite sides of the vehicle oscillatable about generally horizontal axes, and said lever arms having means connecting the same for conjoint movement of oscillation with the adjacent suspension and further having means forming separate articulated connections between the center link section and the lever arms at the ends thereof.

19. A device according to claim 5 in which said stabilizer means comprises a normally upright center link section between the suspensions, said end members comprise lever arms at opposite sides of the vehicle oscillatable about generally horizontal axes and having means connecting the same for conjoint movement with the adjacent suspensions, and means forming separate articulated connections between the normally upright center link section and the lever arms at the ends thereof.

20. A device according to claim 5 for use in conjunction with a torsion load spring type suspension system for vehicles characterized by a pair of generally laterally extending individual suspensions disposed on opposite sides of the vehicle, means including a link type stabilizer element for interconnecting the suspensions to provide anti-roll stability, said stabilizer means includes a normally horizontal center link section, said end member comprising lever arms arranged to oscillate about longitudinally extending axes and in a common vertical plane in mutually perpendicular relationship with respect to the normal horizontal plane containing the center link section, said lever arms having means connecting the same for conjoint movement with the adjacent suspensions, and means forming separate articulated connections between the center link section and the lever arms at the ends thereof.

References Cited in the file of this patent

UNITED STATES PATENTS

| 1,930,208 | Marcum | Oct. 10, 1933 |
| 2,063,719 | Binachon | Dec. 8, 1936 |
| 2,083,381 | Hutchinson | June 8, 1937 |
| 2,410,747 | Reid | Nov. 5, 1946 |
| 2,577,761 | Hickman | Dec. 11, 1951 |

FOREIGN PATENTS

| 368,790 | Germany | Feb. 8, 1923 |